US007180914B2

(12) United States Patent
Walker et al.

(10) Patent No.: US 7,180,914 B2
(45) Date of Patent: Feb. 20, 2007

(54) EFFICIENT ASYNCHRONOUS STUFFING INSERTION AND DESTUFFING REMOVAL CIRCUIT

(75) Inventors: Timothy P. Walker, Boxford, MA (US); Jay Quirk, Kanata (CA); Sean Campeau, Kanata (CA)

(73) Assignee: Applied Micro Circuits Corporation, San Diego, CA (US)

( * ) Notice: Subject to any disclaimer, the term of this patent is extended or adjusted under 35 U.S.C. 154(b) by 1124 days.

(21) Appl. No.: 10/223,572

(22) Filed: Aug. 19, 2002

(65) Prior Publication Data

US 2004/0042474 A1  Mar. 4, 2004

(51) Int. Cl.
*H04J 3/07* (2006.01)
*H04J 3/06* (2006.01)
*H04L 7/00* (2006.01)

(52) U.S. Cl. .................. 370/505; 370/516; 375/372

(58) Field of Classification Search ........ 370/503–506, 370/516, 517; 375/371, 372
See application file for complete search history.

(56) References Cited

U.S. PATENT DOCUMENTS

| 4,596,026 | A | * | 6/1986 | Cease et al. | 375/372 |
|---|---|---|---|---|---|
| 5,268,936 | A | * | 12/1993 | Bernardy | 375/372 |
| 5,359,727 | A | * | 10/1994 | Kurita et al. | 713/400 |
| 5,461,380 | A | * | 10/1995 | Peters et al. | 341/100 |
| 5,497,405 | A | * | 3/1996 | Elliott et al. | 375/372 |
| 5,548,534 | A | * | 8/1996 | Upp | 370/504 |
| 5,737,373 | A | * | 4/1998 | Sato et al. | 375/376 |
| 5,757,871 | A | * | 5/1998 | Furukawa et al. | 375/372 |
| 5,835,543 | A | * | 11/1998 | Mazzurco et al. | 375/372 |
| 6,172,626 | B1 | | 1/2001 | McDonnell et al. | 341/67 |
| 6,266,385 | B1 | | 7/2001 | Roy et al. | 375/372 |
| 6,272,574 | B1 | * | 8/2001 | Hamada | 710/301 |
| 6,289,067 | B1 | | 9/2001 | Nguyen et al. | 375/372 |
| 6,463,111 | B1 | * | 10/2002 | Upp | 375/372 |
| 6,658,074 | B1 | * | 12/2003 | Murakami | 375/372 |
| 6,819,725 | B1 | * | 11/2004 | Oliver et al. | 375/371 |
| 2006/0029174 | A1 | * | 2/2006 | Blake | 375/371 |

* cited by examiner

*Primary Examiner*—Chau T. Nguyen
*Assistant Examiner*—Hong Sol Cho
(74) *Attorney, Agent, or Firm*—Weingarten, Schurgin, Gagnebin & Lebovici LLP

(57) ABSTRACT

A digital communications system that can asynchronously map/de-map digital signals from one clock domain to another, while reducing mapping jitter levels and permitting higher levels of integration. The digital communications system includes an asynchronous stuff bit insertion circuit, an asynchronous stuff bit removal circuit, and a communications network connected therebetween. The asynchronous stuff bit insertion circuit includes a first elastic store, a barrel shifter, and a stuffing circuit. The asynchronous stuff bit removal circuit includes a de-stuffing circuit, a second elastic store, and a frequency control path including a phase-locked loop having a variable divider circuit, the operation of which is controlled based on the presence/ absence of stuff bits in the data provided to the de-stuffing circuit. By employing the first elastic store for temporary gross data frame storage and the barrel shifter for temporary fine data frame storage to reduce the number of gates in the asynchronous stuff bit insertion circuit, integration levels are increased. Further, by employing the frequency control path in the asynchronous stuff bit removal circuit to recover the clock signal of the first clock domain, mapping jitter levels in the digital communications system are reduced.

30 Claims, 6 Drawing Sheets

EFFICIENT ASYNCHRONOUS STUFFING INSERTION AND DESTUFFING REMOVAL CIRCUIT

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to digital communications systems, and more specifically to digital communications systems in which digital signals are asynchronously mapped/de-mapped from one clock domain to another.

Digital communications systems are known that can transport one or more digital signals, e.g., data frames, across multiple clock domains. A conventional digital communications system having such a capability includes a first communications network operating at a first clock rate connected to a second communications network operating at a second clock rate, in which the first clock signal is asynchronous to the second clock signal. The conventional digital communications system further includes a mechanism configured to compensate for the timing differences between the first and second clock signals when transporting the data frames between the first and second clock domains.

In the conventional digital communications system, the timing compensation mechanism typically includes a First-In First-Out (FIFO) buffer, in which digital information comprising incoming data frames can be written into the FIFO buffer at the first clock rate, and digital information comprising outgoing data frames can subsequently be read out of the FIFO buffer at the second clock rate. In the event the rate at which the digital information is written into the FIFO buffer exceeds a first threshold value, the timing compensation mechanism performs at least one negative justification to allow more space in the outgoing data frames for the information. In the event the rate at which the digital information is read out of the FIFO buffer exceeds a second threshold value, the timing compensation mechanism performs at least one positive justification to allow less space in the outgoing data frames for the information. Such negative and positive justifications are typically performed by removing and inserting, respectively, one or more "stuff" bits from/into the data frames. In this way, data frames can be asynchronously mapped from one clock domain to another.

One drawback of the above-described timing compensation mechanism is that sufficient resolution often cannot be achieved using the FIFO buffer. For example, the FIFO buffer may be configured as a 32×16 byte FIFO buffer to provide a resolution of 16 bytes. This means that when removing or inserting stuff bits from/into the data frames based on whether the rate at which digital information is written into/read out of the FIFO buffer is outside the limits set by the first and second threshold values, the "de-stuffing" and "stuffing" operations would typically have to be performed 16 bytes at a time. However, performing de-stuffing and stuffing operations at such a relatively low byte resolution can unduly complicate the asynchronous mapping of the data frames. In addition, variations in the instantaneous rate of the data frames caused by the interspersing of the stuff bits frequently causes mapping jitter to be introduced into the communications system.

Another approach to implementing the above-described timing compensation mechanism is to employ a circular buffer such as a barrel shifter in place of the FIFO buffer. Like the FIFO buffer, digital information comprising incoming data frames is written into the circular buffer at the first clock rate and subsequently read out of the buffer at the second clock rate. Further, stuffing and de-stuffing operations are performed as needed for asynchronously mapping the data frames from the first clock domain to the second clock domain. Moreover, whereas the exemplary FIFO buffer described above provides 16-byte resolution when performing the stuffing and de-stuffing operations, the circular buffer can be configured to provide an increased resolution of up to 1 byte or higher.

However, the timing compensation mechanism including the circular buffer also has drawbacks. For example, in order to match the size of the above-described 32×16 byte FIFO buffer, the circular buffer would have to be configured to store 512 bytes. Further, a significant amount of control logic would typically be required to control the shifting of the data frame bytes through the 512-byte circular buffer. This can be problematic when implementing the circular buffer on an Application Specific Integrated Circuit (ASIC) because such an implementation would normally entail the use of a relatively large number of custom gates, which can increase the die size and lead to increased manufacturing costs. In addition, like the timing compensation mechanism that includes the FIFO buffer, the mechanism including the circular buffer frequently causes mapping jitter to be introduced into the communications system.

It would therefore be desirable to have a digital communications system that has the capability of asynchronously mapping/de-mapping digital signals from one clock domain to another while reducing the level of mapping jitter introduced into the system. It would also be desirable to have such a digital communications system in which the asynchronous mapping/de-mapping capability can be implemented on one or more ASICs with a reduced number of gates.

BRIEF SUMMARY OF THE INVENTION

In accordance with the present invention, a digital communications system is provided that can asynchronously map/de-map digital signals from one clock domain to another, while reducing mapping jitter levels and permitting higher levels of integration. In one embodiment, the digital communications system comprises an asynchronous stuff bit insertion circuit, an asynchronous stuff bit removal circuit, and a communications network connected between the asynchronous stuff bit insertion and removal circuits. The asynchronous stuff bit insertion circuit is configured for asynchronously mapping one or more data frames from a first clock domain to the clock domain of the network. Further, the asynchronous stuff bit removal circuit is configured for asynchronously de-mapping the data frames from the clock domain of the network to the first clock domain.

In the presently disclosed embodiment, the asynchronous stuff bit insertion circuit includes a first elastic store, and a barrel shifter coupled to the first elastic store. The first elastic store operates as a temporary gross data frame storage, while the barrel shifter operates as a temporary fine data frame storage. The first elastic store is configured to receive a predetermined number of bytes of each data frame at a time.

The first elastic store is further configured for temporarily storing a predetermined number of data words, each word having a width equal to the predetermined number of data frame bytes received by the elastic store. The barrel shifter is configured for successively receiving the predetermined number of data frame bytes from the first elastic store, and successively providing the predetermined number of data frame bytes to a stuffing circuit, which is communicatively connected to the communications network. Read and write pointers associated with the barrel shifter are periodically monitored, and in the event the read pointer is within a specified number of locations from the write pointer, the first elastic store is directed to provide the predetermined number of data frame bytes to the barrel shifter. The stuffing circuit is configured to make stuffing decisions based on the periodic measurements of the time delay through the first elastic store and the barrel shifter. In this way, data frames can be asynchronously mapped from the first clock domain to the clock domain of the network.

The asynchronous stuff bit removal circuit includes a de-stuffing circuit for receiving the data frame bytes from the communications network, a first divider circuit coupled to the de-stuffing circuit, a second divider circuit, a second elastic store coupled between the first and second divider circuits, and a frequency control path connecting respective clock inputs of the first and second divider circuits. The clock inputs of the de-stuffing circuit and the first divider circuit are in the clock domain of the network, and the clock input of the second divider circuit is in the above-described first clock domain. The frequency control path includes a phase-locked loop having a variable divider circuit, the operation of which is controlled based on the presence/absence of stuff bits in the data frame bytes provided to the de-stuffing circuit by the network. The asynchronous stuff bit removal circuit is configured for de-stuffing the data frame bytes, and re-covering the clock signal of the first clock domain. In this way, data frames can be asynchronously de-mapped from the clock domain of the communications network to the first clock domain.

By employing the first elastic store for temporary gross data frame storage and the barrel shifter for temporary fine data frame storage to reduce the number of gates in the asynchronous stuff bit insertion circuit, integration levels are increased. Further, by employing the frequency control path in the asynchronous stuff bit removal circuit to recover the clock signal of the first clock domain, mapping jitter levels in the digital communications system are reduced.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

A digital communications system is disclosed that has the capability of asynchronously mapping/de-mapping digital signals from one clock domain to another. In the presently disclosed system, the asynchronous mapping capability is provided by an asynchronous stuff bit insertion circuit, which includes an elastic store for temporary gross data frame storage and a barrel shifter for temporary fine data frame storage. Use of the elastic store in combination with the barrel shifter allows increased levels of integration in the asynchronous stuff bit insertion circuit. Further, the asynchronous de-mapping capability is provided by an asynchronous stuff bit removal circuit, which includes a frequency control path that allows mapping jitter levels in the system to be reduced.

Figure 1:
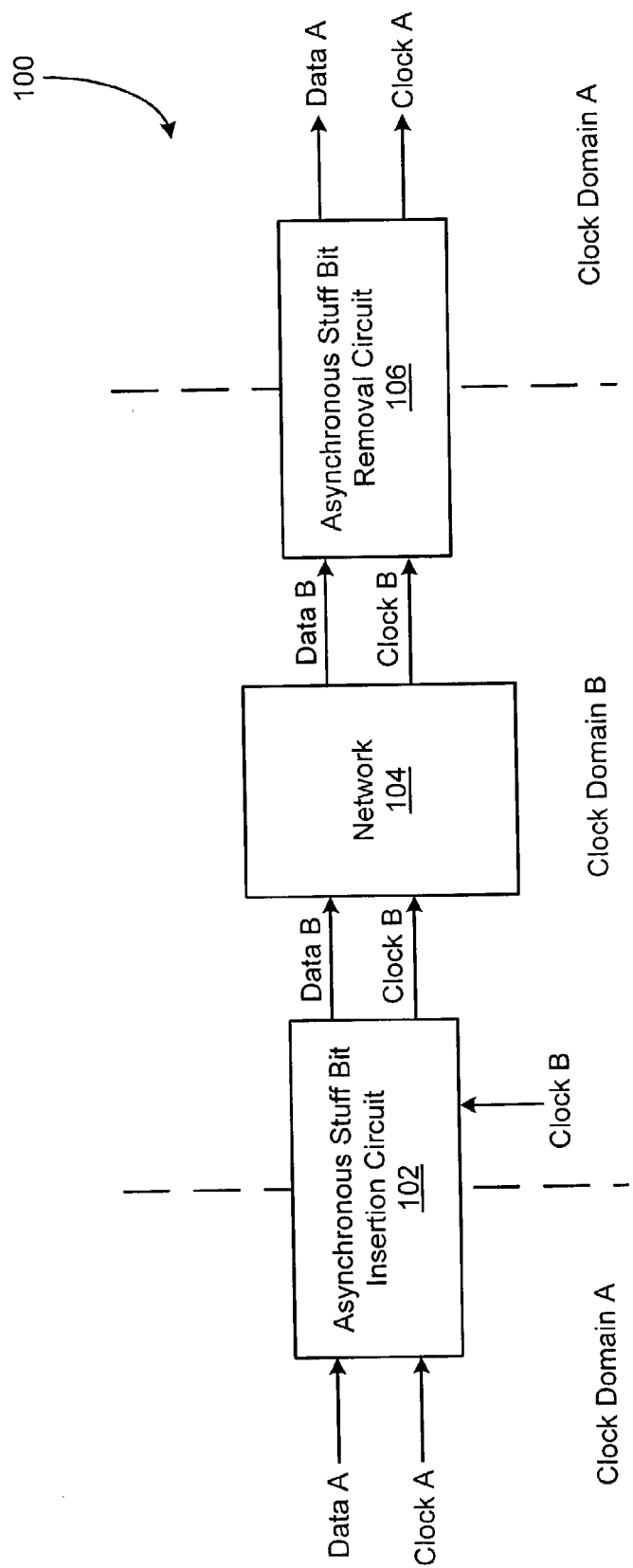
FIG. 1 is a block diagram of a digital communications system according to the present invention.

FIG. 1 depicts an illustrative embodiment of a digital communications system 100, in accordance with the present invention. In the illustrated embodiment, the digital communications system 100 includes an asynchronous stuff bit insertion circuit 102, a communications network 104, and an asynchronous stuff bit removal circuit 106. The asynchronous stuff bit insertion circuit 102 is configured for asynchronously mapping a data signal, e.g., one or more data frames, from a clock domain A to a clock domain B, which includes the network 104. Further, the asynchronous stuff bit removal circuit 106 is configured for asynchronously de-mapping the data frames from the clock domain B to the clock domain A.

For example, the clock domain A may comprise one or more communications networks conforming to the Synchronous Digital Hierarchy (SDH) standard, as specified in the final or most recent published drafts of CCITT/ITU-TS G.707, G.781–G.783, and G.803, which are incorporated herein by reference. Further, the clock domain B may comprise one or more communications networks conforming to the Optical Transport Hierarchy (OTH) standard, as specified in the CCITT Recommendations G.709, October 2001, which is incorporated herein by reference. It should be understood, however, that the respective clock domains A and B may comprise any suitable network(s), in which asynchronous mapping/de-mapping can be employed to transport data frames across the clock domain boundaries. In the presently disclosed embodiment, the clock domain A comprises the SDH clock domain, and the clock domain B comprises the OTH clock domain, for purposes of illustration.

As shown in FIG. 1, the asynchronous stuff bit insertion circuit 102 receives at least one data frame A (the "data A"), a clock signal A (the "clock A"), and a clock signal B (the "clock B"). In the presently disclosed embodiment, because the clock domain A comprises the SDH clock domain and the clock domain B comprises the OTH clock domain, the clock A may have a frequency of, e.g., OC-192/16 or about 622 MHz, and the clock B may have a higher frequency of, e.g., OC-192×255/237/16 or about 669 MHz. Further, the SDH clock A is asynchronous to the OTH clock B. Accordingly, the asynchronous stuff bit insertion circuit 102 is configured for asynchronously mapping the data A from the SDH clock domain A to the OTH clock domain B by filling the excess bandwidth of the OTH clock domain with one or more bits that carry no information (i.e., "stuff bits"), thereby generating at least one corresponding data frame B (the "data B").

Next, the asynchronous stuff bit insertion circuit 102 provides the data B and the clock B to the communications network 104 for subsequent transmission therethrough. As described above, the clock domain B includes the network 104, which conforms to the OTH standard in this illustrative embodiment. The network 104 then provides the data B and the clock B to the asynchronous stuff bit removal circuit 106, which is configured for asynchronously de-mapping the data B from the OTH clock domain B to the reduced bandwidth of the SDH clock domain A by removing the stuff bits from the data B, thereby re-generating the data A. The asynchronous stuff bit removal circuit 106 is further configured to recover the clock A from the clock B.

Figure 2:
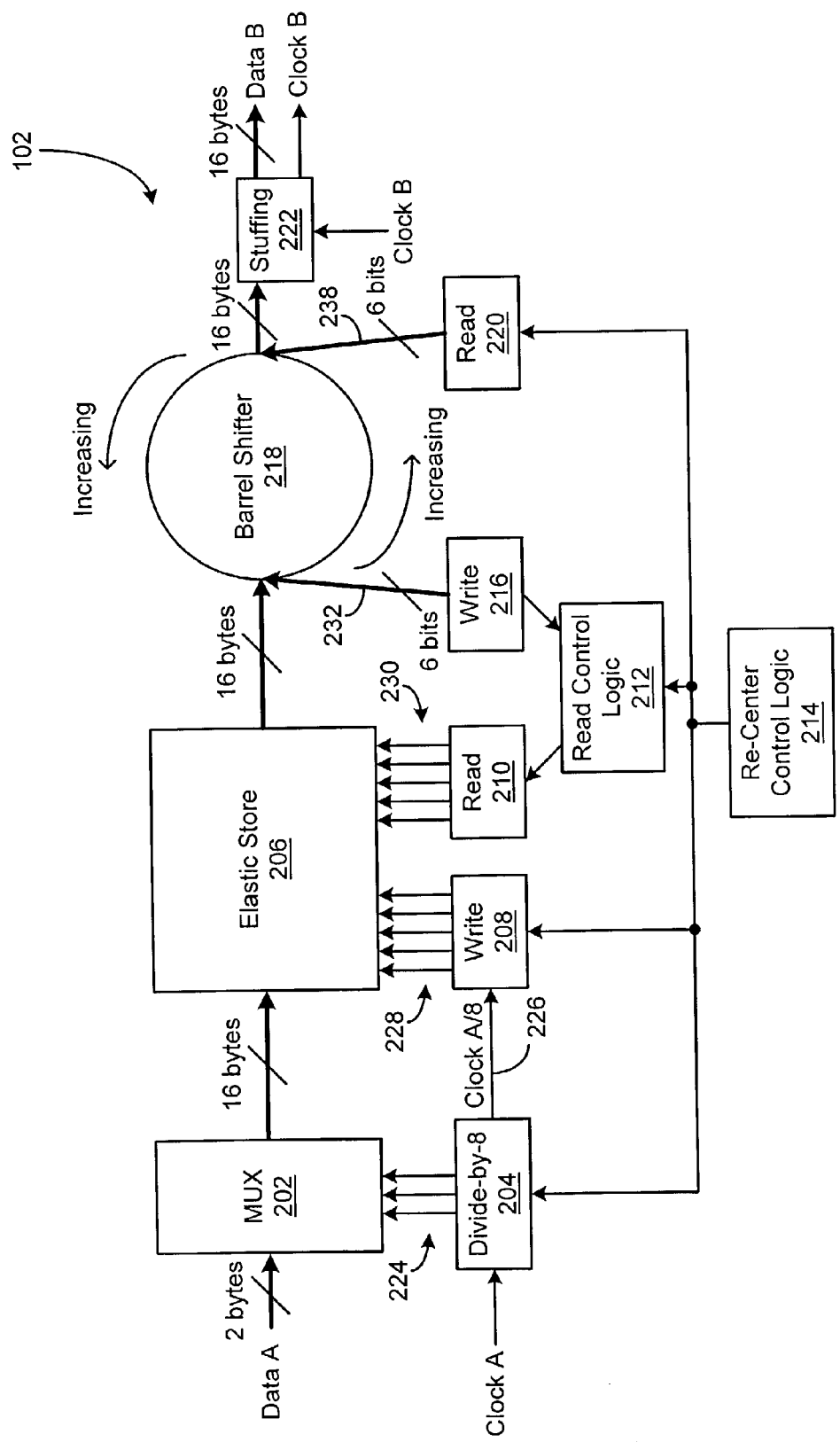
FIG. 2 is a block diagram of an asynchronous stuff bit insertion circuit included in the digital communications system of FIG. 1.

FIG. 2 depicts an illustrative embodiment of the asynchronous stuff bit insertion circuit 102 included in the digital communications system 100 (see FIG. 1) according to the present invention. In the illustrated embodiment, the asynchronous stuff bit insertion circuit 102 includes a multiplexor (the "MUX") 202, a divide-by-8 circuit 204, an elastic store 206, a write counter 208, a read counter 210, read control logic 212, re-center control logic 214, a write control 216, a circular buffer such as a barrel shifter 218, a read control 220, and a stuffing circuit 222. Specifically, the MUX 202 receives the data A, and the divide-by-8 circuit 204 receives the clock A, from the clock domain A. As described above, the data A comprises at least one data frame A, which includes respective pluralities of payload bytes and overhead bytes, and the exemplary clock A has a rate of about 622 MHz (the "clock rate A").

Accordingly, in the presently disclosed embodiment, the MUX 202 successively receives two (2) bytes (i.e., 16 bits) of the data A at a time, in parallel, at the clock rate A. Further, the divide-by-8 circuit 204 provides three (3) binary outputs on lines 224 to corresponding select inputs of the MUX 202. The three binary outputs of the divide-by-8 circuit 204 count from 0 (i.e., 000) to 7 (i.e., 111) at the clock rate A, thereby periodically causing the MUX 202 to provide eight (8) successive pairs of bytes (i.e., 16 bytes), in parallel, of the data A to the elastic store 206.

As shown in FIG. 2, the divide-by-8 circuit 204 provides a clock signal A/8 (the "clock A/8") on a line 226 to the write counter 208. Specifically, the clock A/8 has a frequency equal to the clock rate A divided by 8 (i.e., about 78 MHz). For example, the clock A/8 may correspond to the Most Significant Bit (MSB) of the three binary outputs provided to the MUX 202 on the lines 224 by the divide-by-8 counter 204.

Accordingly, the write counter 208 provides five (5) binary outputs on lines 228 to corresponding write address inputs of the elastic store 206. The five binary outputs of the write counter 208 count from 0 (i.e., 00000) to 31 (i.e., 11111) at the clock rate A/8, thereby causing the elastic store 206 to write successive groups of 16 bytes of the data A, provided by the MUX 202, to corresponding ones of the 32 storage locations included therein. In the presently disclosed embodiment, the elastic store 206 has a total capacity of 32×16 bytes.

Further, the read counter 210 provides five (5) binary outputs on lines 230 to corresponding read address inputs of the elastic store 206. Like the write counter 208, the five binary outputs of the read counter 210 count from 0 (i.e., 00000) to 31 (i.e., 11111), thereby causing the elastic store 206 to read successive groups of 16 bytes of the data A from corresponding storage locations in the elastic store 206, and to provide the 16 bytes, in parallel, to the barrel shifter 218. It is noted that the elastic store 206 is configured for successively receiving the 16 bytes from the MUX 202, and for providing the 16 bytes to the barrel shifter 218, on a first-in first-out basis. The elastic store 206 therefore operates as a First-In First-Out (FIFO) buffer.

The write control 218 provides a 6-bit write pointer on lines 232 to corresponding write address inputs of the barrel shifter 218, and the read control 220 provides a 6-bit read pointer on lines 238 to corresponding read address inputs of the barrel shifter, at the clock rate A/8. In the presently disclosed embodiment, the barrel shifter 218 has a total capacity of 64 bytes. Accordingly, FIG. 2 conceptually depicts the counter-clockwise direction of increasing write/read address values, i.e., 0–63, for the barrel shifter 218.

The asynchronous stuff bit insertion circuit 102 is operative to determine whether the barrel shifter 218 reads the 16 bytes of the data A from the elastic store 206 to the corresponding storage location of the barrel shifter 218 by monitoring the write and read pointer values provided by the write and read controls 218 and 220, respectively. In the presently disclosed embodiment, in the event the values of the write and read pointers get too close, e.g., within 16 bytes, the barrel shifter 218 reads the 16 bytes provided by the elastic store 206. Specifically, the read control logic 212 monitors the write and read pointer values provided by the respective write and read controls 218 and 220, and in the event the read control logic 212 determines that the write and read pointer values are within, e.g., 16 bytes of each other, the read control logic 212 sends a control signal to the read counter 210, thereby causing the elastic store 206 to provide the 16 bytes of the data A corresponding to the value at its read address inputs to the barrel shifter 218.

It is noted that the re-center control logic 214 is configured to put the current address and pointer values of the elastic store 206 and the barrel shifter 218, respectively, into known states, thereby preventing the elastic store 206 and the barrel shifter 218 from straying too far away from the center of the respective buffers. In the presently disclosed embodiment, the re-center control logic 214 performs the re-center operation each time a "frame sync" is generated by a user (e.g., a human operator or a computer process) of the digital communications system 100 (see FIG. 1). Specifically, the re-center control logic 214 operates as an asynchronous reset (or pre-set) for the divide-by-8 circuit 204, the write counter 208, and the read control 220. The re-center control logic 214 is further operative to set the current write pointer value provided by the write control 216 to "32" (i.e., at about halfway within the range of write pointer values 0–63), and to set the current read pointer value provided by the read counter 210 to "16" (i.e., at about halfway within the range of read address values 0–31). In this way, the elastic store 206 and the barrel shifter 218 can be kept at approximately constant depths, e.g., half full.

As shown in FIG. 2, the barrel shifter 218 reads the 16 bytes of the data A from the storage locations included therein, as dictated by the read pointer value on the line 238, and provides the 16 bytes, in parallel, to the stuffing circuit 222. Like the elastic store 206, the barrel shifter 218 successively receives the 16 bytes from the elastic store 206, and provides the 16 bytes to the stuffing circuit 222, on a first-in first-out basis.

The stuffing circuit 222 asynchronously maps the data A from the SDH clock domain A to the OTH clock domain B (see FIG. 1) by filling the excess bandwidth of the OTH clock domain with one or more stuff bits, thereby generating the data B. In the preferred embodiment, the stuffing circuit 222 (see FIG. 2) is operative to determine whether to insert one or more stuff bits into the data frame A by measuring the total time delay through the elastic store 206 and the barrel shifter 218 once per data frame. For example, the time delay through the elastic store 206 may be represented as:

Time_Delay1=Write_Address (W8,W7,W6,W5,W4, W3,W2,W1,W0)−Read_Address (R8,R7,R6,R5, R4,R3,R2,R1,R0),  (1)

in which the Least Significant Bit (LSB) "W0" is set to zero, the bits "W1–W3" correspond to the binary outputs of the divide-by-8 circuit 204 on the lines 224, the bits "W4–W8" correspond to the binary outputs of the write counter 208 on the lines 228, the bits "R0–R3" are set to zero, and the bits "R4–R8" correspond to the binary outputs of the read counter 210 on the lines 230.

Moreover, the time delay through the barrel shifter 218 may be represented as:

Time_Delay2=Write_Ptr (BW5,BW4,BW3,BW2, BW1,BW0)−Read_Ptr (BR5,BR4,BR3,BR2, BR1,BR0),  (2)

in which the bits "BW0–BW5" correspond to the binary outputs of the write control 218 on the lines 232, and the bits "BR0–BR5" correspond to the binary outputs of the read control 220 on the lines 238. The total time delay through the elastic store 206 and the barrel shifter 218 may therefore be represented as:

Total_Delay=Time_Delay1+Time_Delay2,  (3)

in which "Time_Delay1" and "Time_Delay2" are defined as in equations 1 and 2 above.

Accordingly, in the event the stuffing circuit 222 determines that the total delay through the elastic store 206 and the barrel shifter 218 exceeds a predetermined "high" threshold value, i.e., Total_Delay>High_Threshold,  (4)

data is being read at too slow a rate, and therefore the stuffing circuit 222 performs a negative stuff operation on the current data frame A. In the event the stuffing circuit 222 determines that the total delay through the elastic store 206 and the barrel shifter 218 is below a predetermined "low" threshold value, i.e., Total_Delay<Low_Threshold,  (5)

data is being read at too fast a rate, and therefore the stuffing circuit 222 performs a positive stuff operation on the current data frame A. It is noted that even though the exemplary elastic store 206 is 16 bytes wide, employing the binary outputs provided by the divide-by-8 counter 204 on the lines 224 when determining the time delay, Time_Delay1, through the elastic store 206 makes it possible to achieve 2-byte accuracy.

The stuffing algorithm employed by the stuffing circuit 222 for determining whether to perform a negative stuff operation, a positive stuff operation, or no stuff operation on the current data frame A will be better understood with reference to the following TABLES 1–2:

TABLE 1

Justification Control (JC) Bits

| JC | NJO | PJO | Description |
|---|---|---|---|
| 00 | No Data | Data | No Stuff |
| 01 | Data | Data | Negative Stuff |
| 10 | Not Generated | Not Generated | Not Generated |
| 11 | No Data | No Data | Positive Stuff |

TABLE 2

Stuffing Algorithm

| LT | HT | JC | Action |
|---|---|---|---|
| 0 | 0 | 00 | No Stuff |
| 0 | 1 | 01 | Negative Stuff |
| 1 | 0 | 11 | Positive Stuff |
| 1 | 1 | 10 | Invalid State | in which "HT" indicates that the Total_Delay (see equation 3) has crossed the High_Threshold, "LT" indicates that the Total_Delay (see equation 3) has crossed the Low_Threshold, "JC" is the Justification Control signal, "NJO" is the Negative Justification Opportunity byte, and "PJO" is the Positive Justification Opportunity byte.

There are therefore three valid states, and one invalid state, in the above-described stuffing algorithm. Specifically, the first valid state is the "No Stuff" state, in which the total delay (Total_Delay; see equation 3) through the elastic store 206 and the barrel shifter 218 crosses neither the predetermined high threshold value nor the predetermined low threshold value (HT=0, LT=0; see TABLE 2). Accordingly, when the stuffing algorithm is in the No Stuff state, the stuffing circuit 222 performs no stuff operation on the current data frame A (JC=00, NJO=No Data, PJO=Data; see TABLE 1).

The second valid state is the "Negative Stuff" state, in which the Total_Delay value (see equation 3) crosses the predetermined high threshold value (HT=1, LT=0; see TABLE 2). Accordingly, when the stuffing algorithm is in the Negative Stuff state, the stuffing circuit 222 performs a negative stuff operation on the current data frame A (JC=01, NJO=Data, PJO=Data).

The third valid state is the "Positive Stuff" state, in which the Total_Delay value (see equation 3) crosses the predetermined low threshold value (LT=1, HT=0; see TABLE 2). Accordingly, when the stuffing algorithm is in the Positive Stuff state, the stuffing circuit 222 performs a positive stuff operation on the current data frame A (JC=11, NJO=No Data, PJO=No Data; see TABLE 1).

It is noted that the invalid state (LT=1, HT=1, JC=10; see TABLE 2) is not generated by the stuffing algorithm because the Total_Delay value (see equation 3) cannot cross both of the predetermined low and high threshold values in the same data frame. The stuffing circuit 222 then provides the 16 bytes of the data B to the communications network 104 (see FIG. 1) for subsequent transmission therethrough.

Figure 4:
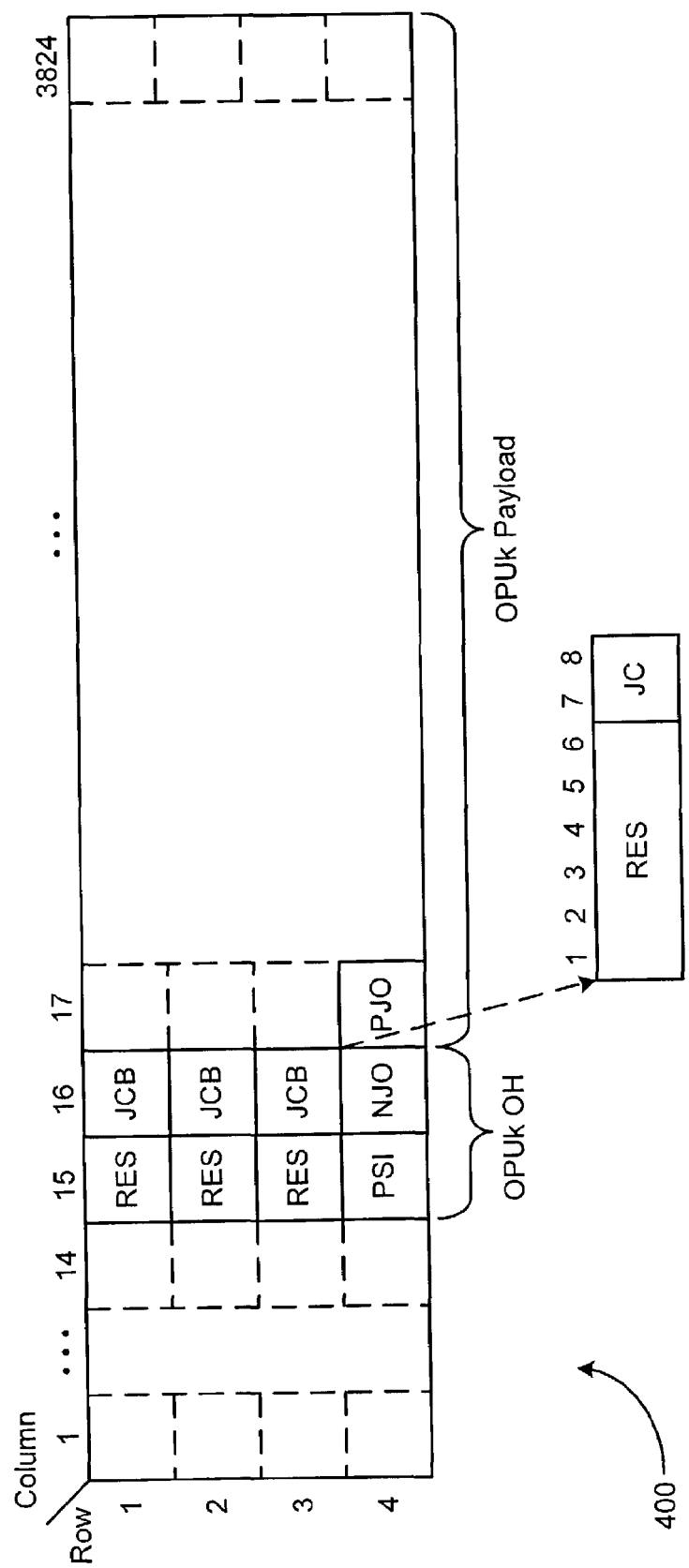
FIG. 4 is a diagram of a data frame structure employed in the digital communications system of FIG. 1.

FIG. 4 depicts an illustrative data frame structure 400 employed in the digital communications system 100 (see FIG. 1) for the asynchronous mapping of data frames from the clock domain A to the clock domain B. In the presently disclosed embodiment, the data frame structure 400 comprises the OPUk data frame structure, as defined in the above-mentioned CCITT Recommendations G.709. However, it should be understood that any suitable data frame structure may be employed.

Specifically, the OPUk frame structure 400 has four rows and 3824 columns of bytes including a plurality of OPUk payload bytes disposed in columns 17–3824, and a plurality of OPUk overhead (OH) bytes disposed in columns 15–16. As shown in FIG. 4, the OPUk overhead bytes include a Payload Structure Identifier (PSI), three Justification Control Bytes (JCB), the Negative Justification Opportunity (NJO; see TABLE 1) byte, and three additional bytes reserved for future international standardization (RES). It is noted that the JCBs include the two bits for Justification Control (JC; see TABLES 1–2) and six bits reserved for future international standardization (RES). Moreover, the OPUk payload bytes comprise 4×3808 bytes including the Positive Justification Opportunity (PJO; see TABLE 1) byte.

Accordingly, the stuffing circuit 222 (see FIG. 2) asynchronously maps the data A from the clock domain A to the clock domain B (see FIG. 1) to generate the data B by inserting suitable data bytes in the NJO and PJO byte positions (negative stuff operation), inserting stuff bytes in the NJO and PJO byte positions (positive stuff operation), or providing a stuff byte in the NJO byte position and a suitable data byte in the PJO byte position (no stuff operation) of the exemplary data frame (see FIG. 4), based on whether the total delay (Total_Delay; see equation 3) through the elastic store 206 and the barrel shifter 218 crosses the predetermined high threshold value, crosses the predetermined low threshold value, or crosses neither the predetermined high nor the low threshold value.

Figure 3:
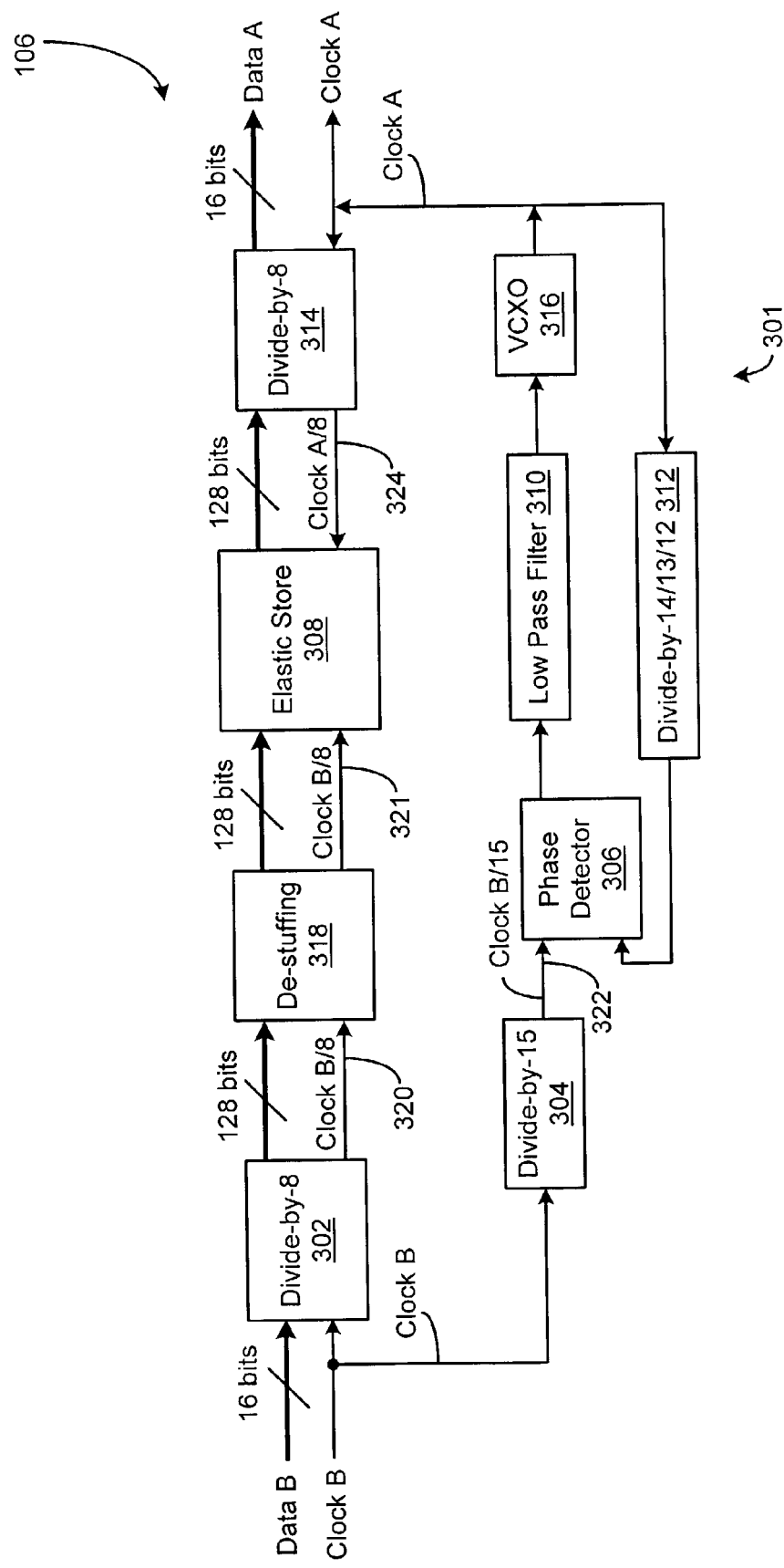
FIG. 3 is a block diagram of an asynchronous stuff bit removal circuit included in the digital communications system of FIG. 1.

FIG. 3 depicts an illustrative embodiment of the asynchronous stuff bit removal circuit 106 included in the digital communications system 100 (see FIG. 1) according to the present invention. In the illustrated embodiment, the asynchronous stuff bit removal circuit 106 (see FIG. 3) includes two divide-by-8 counters 302 and 314, a de-stuffing circuit 318, an elastic store 308, and a frequency control path comprising a divide-by-15 counter 304 and a Phase-Locked Loop (PLL) 301 including a phase detector 306, a low pass filter 310, a Voltage Controlled Crystal Oscillator (VCXO) 316, and a divide-by-14/13/12 circuit 312, which constitutes a variable divider circuit. For example, the PLL 301 may have a loop bandwidth of about 300 Hz, the phase detector 306 may have a peak-to-peak voltage of about 1 V, and the VCXO 316 may have a gain of about 100 ppm/V at the clock rate A (i.e., 622 MHz).

Specifically, the divide-by-8 counter 302 receives 16 bits of the data B, and the clock B, from the communications network 104 (see FIG. 1). Next, the divide-by-8 circuit 302 provides a clock signal B/8 (the "clock B/8") on a line 320 to the de-stuffing circuit 318 (see FIG. 3). Specifically, the clock B/8 has a frequency equal to the clock rate B divided by 8 (i.e., about 84 MHz). In order to maintain the data flow through the asynchronous stuff bit removal circuit 106 at this reduced clock rate, the divide-by-8 circuit 302 further provides 128 bits of data, in parallel, to the de-stuffing circuit 318. The de-stuffing circuit 318 then provides the 128 bits of data (with the stuff bits removed), in parallel, to the elastic store 308. For example, the elastic store 308 may have a total capacity of 4×128 bits. The de-stuffing circuit 318 further provides the clock B/8 to the elastic store 308 on a line 321. It is noted that the de-stuffing circuit 318 removes the stuff bits that were inserted in the NJO and/or PJO byte positions of the data frame by the stuffing circuit 222 (see FIG. 2) during execution of the above-described stuffing algorithm (see TABLE 2).

The divide-by-15 circuit 304 receives the clock B, and provides a clock signal B/15 (the "clock B/15") on a line 322 to the PLL 301, particularly, the phase detector 306. The clock B/15 has a frequency equal to the clock rate B divided by 15 (i.e., about 45 MHz).

The frequency control path comprising the divide-by-15 counter 304 and the PLL 301 is configured for recovering the clock A from the clock B. Further, the divide-by-8 circuit 314 is configured to employ the recovered clock A for completing the asynchronous de-mapping of the data frames from the clock domain B to the clock domain A. In the presently disclosed embodiment, the asynchronous stuff bit removal circuit 106 recovers the clock A and de-maps the data frames A by a frequency synthesis technique that controls the divide-by-14/13/12 circuit 312 based on the presence/absence of stuff bytes in the data B. Specifically, the divide-by-14/13/12 circuit 312 is controlled to divide by 14 with the following two exceptions: (1) every $17^{th}$ reset of the divide-by-8 circuit 204, the write counter 208, and the read control 220 (see FIG. 2), the divide-by-14/13/12 circuit 312 (see FIG. 3) is controlled to divide by 13, and (2) every $64^{th}$ time of the $17^{th}$ time, the divide-by-14/13/12 circuit 312 is controlled to divide by 14, 13, or 12 depending on the presence/absence of the stuff bytes. Such control of the divide-by-14/13/12 circuit 312 is achieved by the Divide-By algorithm summarized in the following TABLE 3:

TABLE 3

Divide-By Algorithm

| JC | NJO | PJO | Action | Divide-By |
|----|-----|-----|--------|-----------|
| 00 | No Data | Data | No Stuff | 13 |
| 01 | Data | Data | Negative Stuff | 14 |
| 11 | No Data | No Data | Positive Stuff | 12 |

The operation of the frequency control path of the asynchronous stuff bit removal circuit 106 (see FIG. 3) for recovering the clock A and de-mapping the data frames A will be better understood with reference to the following analysis, in which it is assumed that each data frame has 3792 (237×16) columns of data out of a total of 4080 (255×16) columns, the clock A has a frequency of 622 MHz (i.e., OC-192/16), and the clock B has a frequency of 669 MHz (i.e., OC-192×255/237/16).

Accordingly, in the event the stuffing circuit 222 (see FIG. 2) performs a No Stuff action (see TABLE 3) on the current data frame, the input frequency to the PLL 301 is (255/237)×622 MHz, and the output frequency of the PLL 301 is 622 MHz. The PLL 301 therefore multiplies the frequency at its input by 237/255 to recover the clock rate A of 622 MHz. Because the divide-by-15 circuit 304 is at the input of the frequency control path, the divide-by-14/13/12 circuit 312 is controlled to provide a Divide-By ratio of 237/17=14−(1/17). In general, if we divide by N−1 every M cycles, and divide by N the rest of the time, then the effective Divide-By ratio is N−(1/M). In this analysis, N=14 and M=17.

In the event the stuffing circuit 222 performs a Positive Stuff action (see TABLE 3) on every data frame, the input frequency to the PLL 301 is off one byte every 237×4×16 (i.e., 15168) bytes. The frequency at the output of the PLL 301 is therefore 15167/15168×622 MHz, and the PLL 301 has to multiply by (237/255)×(15167/15168). Because the divide-by-15 circuit 304 is at the input of the frequency control path, the divide-by-14/13/12 circuit 312 is controlled to provide a Divide-By ratio of $$(237/17) \times (15167/15168) = 15167/1088 = 14 - (1/17) - (1/1088). \quad (6)$$

In general, if we divide by N−1 every M cycles, divide by N−2 every M×P cycles, and divide by N the rest of the time, then the effective Divide-By ratio is N−(1/M)−(1/MP). In this analysis, N=14, M=17, and P=64.

To verify the Divide-By algorithm for the No Stuff action (NJO=No Data, PJO=Data; see TABLE 3), it is assumed that the incoming data rate is (255/237)×16×622 MHz, and the incoming data frame time is (Frame Size)/(Rate), or $$4080 \times 4 \times 8 \times (237/255)/(16 \times 622 \text{ MHz}) = 12.2 \text{ } \mu s. \quad (7)$$

Further, the number of input pulses at the phase detector 306 per frame is (Frame Size)/16/(Divide Ratio), or $$4080 \times 4 \times 8/16/15 = 544. \quad (8)$$

Now, consider the number of output pulses at the phase detector 306 per frame. First, we take the No Stuff case, in which the output is divided by 14 or 13. Accordingly, the outgoing data rate is 16×622 MHz (i.e., OC-192), the outgoing time for one data frame is $$(237 \times 16 \times 4 \times 8)/\text{OC-192} = 12.2 \text{ } \mu s, \quad (9)$$

the number of output pulses at the phase detector 306 per frame is (Rate/16)×Time/(Divide Ratio), and the Divide Ratio is (16×14+13/17)=237/17. This means that there are 17 output pulses for (16×14+13)=237 input pulses. Accordingly, the number of output pulses at the phase detector 306 per frame is $$(\text{OC-192}/16) \times (237 \times 16 \times 4 \times 8)/\text{OC-192}/(237/17) = 4 \times 8 \times 17 = 544, \quad (10)$$

which is equal to the number of input pulses at the phase detector 306 per frame (see equation 8). The Divide-By algorithm for the No Stuff action (see TABLE 3) is therefore successfully verified.

To verify the Divide-By algorithm for the case in which the Positive Stuff action (NJO=PJO=No Data; see TABLE 3) is performed every fourth frame, it is assumed that the reference frequency at the phase detector 306 input is nominal. The input frequency to the PLL 301 is therefore off one byte every 237×4×16×4 bytes or 16.5 ppm. This means that the output frequency is lower than expected. For example, if the frequency at the input of the phase detector 306 is 15167.75/15168×(OC−192), then the frequency at the output is 15167.75/15168×(OC−192). Because the Positive Stuff action is being performed once in four frames, the Divide-By ratio is 4×17×64 output pulses for $$3 \times ((16 \times 14 + 13) \times 63 + (16 \times 14 + 13)) + (16 \times 14 + 13) \times 63 + (16 \times 14 + 12)$$

input pulses, i.e., 4352 output pulses for 60671 input pulses, or a Divide-By ratio of 60671/4352. The number of output pulses at the phase detector 306 per frame is $$\text{Rate}/16 \times \text{Time}/(\text{Divide Ratio}) = \quad (11)$$
$$15167.75/15168 \times (OC - 192/16) \times ((237 \times 16 \times 4) \times 8)/OC - 192/(60671/4352) = 15167.75/15168/16 \times$$
$$(15168 \times 8)/(15167.75 \times 4/(8 \times 544)) = 544,$$

which is equal to the number of input pulses at the phase detector 306 per frame (see equation 8). The Divide-By algorithm for the Positive Stuff action (see TABLE 3) is therefore successfully verified.

In the above analysis, there are 544 pulses per frame at the phase detector 306 (see FIG. 3). There are normally $$\text{Rate}/16 \times (\text{Frame Time}) = \text{OC-192}/16 \times 4080 \times 4 \times 8 \times 237/255/\text{OC-192} = 7584 \quad (12)$$

pulses at the output of the PLL 301. Further, one Positive Stuff action corresponds to a frequency change of 15167/15168, or $$15167/15168 \times 7584 = 7583.5 \quad (13)$$

pulses at the PLL 301 output. Accordingly, for this analysis, two Positive Stuff actions are needed before changing the variable divide-by-14/13/12 circuit 312.

As shown in FIG. 3, the PLL 301 provides the recovered clock A to the divide-by-8 circuit 314, which in turn provides a clock signal A/8 (the "clock A/8") on a line 324 to the elastic store 308. Specifically, the clock A/8 has a frequency equal to the clock rate A divided by 8 (i.e., about 78 MHz). In order to complete the asynchronous de-mapping of the data frames from the clock domain B to the clock domain A, the divide-by-8 circuit 314 receives the 128 bits of data, in parallel, from the elastic store 308 at the clock rate A/8, and provides 16 bits of data, in parallel, at the clock rate A. It is noted that like the elastic store 206, the elastic store 308 provides the 128 bits to the divide-by-8 circuit 314 on a first-in first-out basis. The elastic store 308 therefore operates as a FIFO buffer.

Figure 5A:
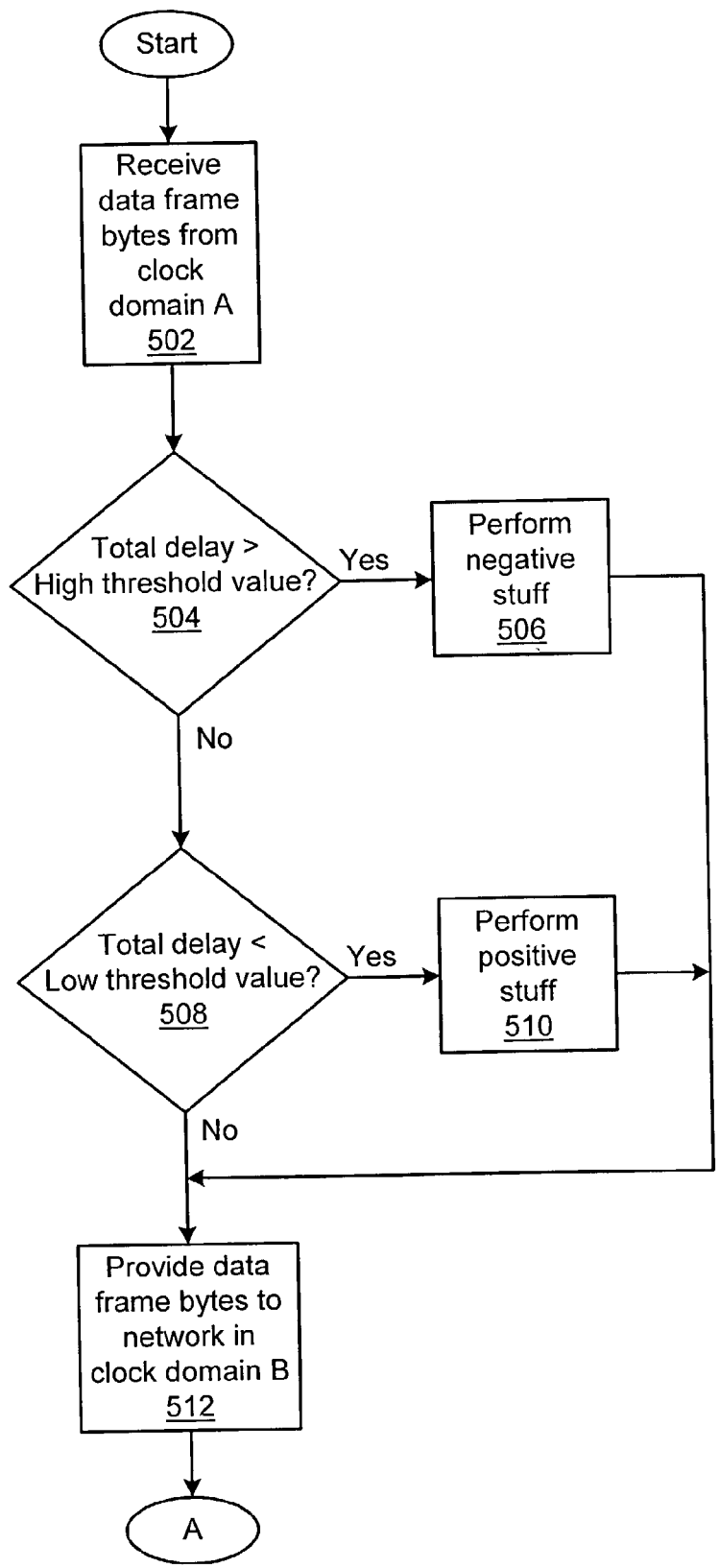
FIGS. 5a–5b depict a flow diagram of a method of operating the digital communications system of FIG. 1.
Figure 5B:
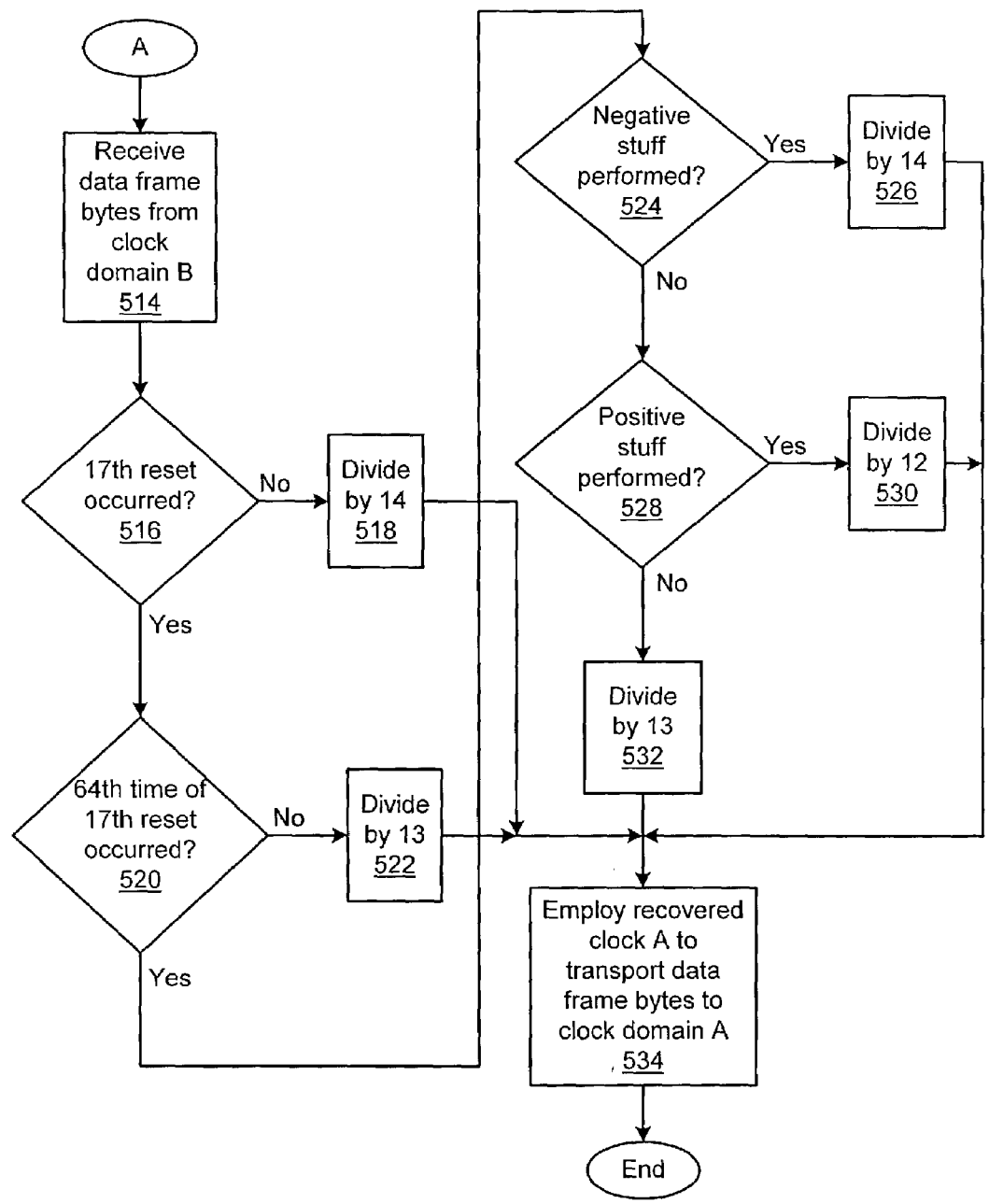

A method of operating the digital communications system for asynchronously mapping/de-mapping data frames across the boundaries of the clock domains A and B using the above-described stuffing and divide-by algorithms (see TABLES 2–3) is illustrated by reference to FIGS. 5a–5b. As depicted in step 502 (see FIG. 5a), a plurality of bytes of a data frame is received from the clock domain A by the asynchronous stuff bit insertion circuit, for subsequent transmission through the serially coupled elastic store and barrel shifter included therein. Next, a determination is made, as depicted in step 504, as to whether the total delay through the elastic store and the barrel shifter exceeds a predetermined high threshold value. In the event the total delay through the elastic store and the barrel shifter exceeds the high threshold value, the asynchronous stuff bit insertion circuit performs, as depicted in step 506, a negative stuff operation on the current data frame. A determination is then made, as depicted in step 508, as to whether the total delay through the elastic store and the barrel shifter is below a predetermined low threshold value. In the event the total delay through the elastic store and the barrel shifter crosses the low threshold value, the asynchronous stuff bit insertion circuit performs, as depicted in step 510, a positive stuff operation on the current data frame. It is noted that if the total delay through the elastic store and the barrel shifter crosses neither the high threshold value nor the low threshold value, then the asynchronous stuff bit insertion circuit performs no stuff operation on the current data frame. Next, the plurality of data frame bytes is provided, as depicted in step 512, to the communications network in the clock domain B for subsequent transmission therethrough. The plurality of data frame bytes is then received, as depicted in step 514 (see FIG. 5b), by the asynchronous stuff bit removal circuit, which comprises the divide-by-15 circuit and the PLL including the variable divide-by-14/13/12 circuit for recovering the clock A from the clock B. A determination is made, as depicted in step 516, as to whether the $17^{th}$ reset of the counters included in the asynchronous stuff bit insertion circuit has occurred. In the event the 17$^{th}$ reset has not yet occurred, the divide-by-14/13/12 circuit is controlled, as depicted in step 518, to divide by 14. In the event the 17$^{th}$ reset has occurred, a determination is made, as depicted in step 520, as to whether the 64$^{th}$ time of the 17$^{th}$ reset has occurred. In the event the 64$^{th}$ time of the 17$^{th}$ reset has not yet occurred, the divide-by-14/13/12 circuit is controlled, as depicted in step 522, to divide by 13. In the event the 64$^{th}$ time of the 17$^{th}$ reset has occurred, a determination is made, as depicted in step 524, as to whether the negative stuff operation had been performed on the current data frame. In the event the negative stuff operation had been performed on the current frame, the divide-by-14/13/12 circuit is controlled, as depicted in step 526, to divide by 14. A determination is then made, as depicted in step 528, as to whether the positive stuff operation had been performed on the current data frame. In the event the positive stuff operation had been performed on the current frame, the divide-by-14/13/12 circuit is controlled, as depicted in step 530, to divide by 12. In the event no stuff operation had been performed on the current frame, the divide-by-14/13/12 circuit is controlled, as depicted in step 532, to divide by 13. The recovered clock A is then employed, as depicted in step 534, by the asynchronous stuff bit removal circuit to transport the plurality of data frame bytes across the boundary from the clock domain B to the clock domain A.

It will further be appreciated by those of ordinary skill in the art that modifications to and variations of the above-described asynchronous stuffing insertion and de-stuffing removal circuit may be made without departing from the inventive concepts disclosed herein. Accordingly, the invention should not be viewed as limited except as by the scope and spirit of the appended claims.

What is claimed is:

1. In a communications system comprising a plurality of clock domains, an apparatus for asynchronously mapping digital data from a first clock domain to a second clock domain, comprising:
    a first buffer configured to store digital data from the first clock domain;
    a second buffer configured to store at least a portion of the data from the first buffer based on an available data storage capacity of the second buffer, the first and second buffers having respective time delays associated therewith; and
    a stuffing circuit configured to map the data from the second buffer to the second clock domain by inserting at least one stuff bit in the data,
    wherein the stuffing circuit is configured to determine whether to insert the at least one stuff bit based on a total time delay of the first and second buffers.

2. The apparatus of claim 1 wherein the first buffer comprises a first-in first-out buffer.

3. The apparatus of claim 1 wherein the second buffer comprises a circular buffer.

4. The apparatus of claim 1 wherein the stuffing circuit is connectable to a communications network within the second clock domain.

5. The apparatus of claim 1 wherein the stuffing circuit is configured to perform a negative stuff operation on the data in the event the total time delay of the first and second buffers exceeds a predetermined high threshold value.

6. The apparatus of claim 1 wherein the stuffing circuit is configured to perform a positive stuff operation on the data in the event the total time delay of the first and second buffers is below a predetermined low threshold value.

7. The apparatus of claim 1 wherein the digital data comprises at least one data frame conforming to CCITT Recommendations G.709.

8. In a communications system comprising a plurality of clock domains, an apparatus for asynchronously de-mapping digital data from a first clock domain to a second clock domain, comprising:
    a de-stuffing circuit configured to de-map digital data from the first clock domain to the second clock domain by removing at least one stuff bit from the data;
    a buffer configured to store the data from the de-stuffing circuit at a first clock rate, and to provide the data to the second clock domain at a second clock rate; and
    a frequency control path configured to generate a second clock having the second clock rate from a first clock having the first clock rate, the frequency control path including a first frequency divider, and a phase-locked loop coupled to the first frequency divider, the phase-locked loop including a phase detector, a low pass filter, and a voltage-controlled oscillator in a feed forward path, and a second frequency divider in a feedback path,
    wherein the second frequency divider is variable based at least in part on a presence or absence of stuff bits in the digital data from the first clock domain.

9. The apparatus of claim 8 wherein the buffer comprises a first-in first-out buffer.

10. The apparatus of claim 8 wherein the de-stuffing circuit is connectable to a communications network within the first clock domain.

11. The apparatus of claim 8 wherein the second frequency divider is configured to divide by a first predetermined value based on whether a negative stuff operation is performed on the data.

12. The apparatus of claim 8 wherein the second frequency divider is configured to divide by a second predetermined value based on whether a positive stuff operation is performed on the data.

13. The apparatus of claim 8 wherein the digital data comprises at least one data frame conforming to CCITT Recommendations G.709.

14. A communications system, comprising:
    a mapping circuit for asynchronously mapping digital data from a first clock domain to a second clock domain;
    a de-mapping circuit for asynchronously de-mapping the digital data from the second clock domain to the first clock domain; and
    at least one communications network within the second clock domain connected between the mapping circuit and the de-mapping circuit,
    wherein the mapping circuit includes
    a first buffer configured to store the digital data from the first clock domain,
    a second buffer configured to store at least a portion of the data from the first buffer based on an available data storage capacity of the second buffer, the first and second buffers having respective time delays associated therewith, and
    a stuffing circuit configured to map the data from the second buffer to the second clock domain by inserting at least one stuff bit in the data, the stuffing circuit being configured to determine whether to insert the at least one stuff bit based on a total time delay of the first and second buffers, and
    wherein the de-mapping circuit includes a de-stuffing circuit configured to de-map the digital data from the second clock domain to the first clock domain by removing at least one stuff bit from the data, a third buffer configured to store the data from the de-stuffing circuit at a second clock rate, and to provide the data to the first clock domain at a first clock rate; and a frequency control path configured to generate a first clock having the first clock rate from a second clock having the second clock rate, the frequency control path including a first frequency divider, and a phase-locked loop coupled to the first frequency divider, the phase-locked loop including a phase detector, a low pass filter, and a voltage-controlled oscillator in a feed forward path, and a second frequency divider in a feedback path, wherein the second frequency divider is variable based at least in part on a presence or absence of stuff bits in the digital data from the second clock domain.

15. The system of claim 14 wherein the first buffer comprises a first-in first-out buffer.

16. The system of claim 14 wherein the second buffer comprises a circular buffer.

17. The system of claim 14 wherein the third buffer comprises a first-in first-out buffer.

18. The system of claim 14 wherein the digital data comprises at least one data frame conforming to CCITT Recommendations G.709.

19. The system of claim 14 wherein the stuffing circuit is configured to perform a negative stuff operation on the data in the event the total time delay of the first and second buffers exceeds a predetermined high threshold value.

20. The system of claim 14 wherein the stuffing circuit is configured to perform a positive stuff operation on the data in the event the total time delay of the first and second buffers is below a predetermined low threshold value.

21. The system of claim 14 wherein the second frequency divider is configured to divide by a first predetermined value based on whether a negative stuff operation is performed on the data.

22. The system of claim 14 wherein the second frequency divider is configured to divide by a second predetermined value based on whether a positive stuff operation is performed on the data.

23. In a communications system comprising a plurality of clock domains, a method for asynchronously mapping digital data from a first clock domain to a second clock domain, comprising the steps of:

storing digital data from the first clock domain by a first buffer;

storing at least a portion of the data from the first buffer by a second buffer based on an available data storage capacity of the second buffer, the first and second buffers having respective time delays associated therewith; and mapping the data from the second buffer to the second clock domain by a stuffing circuit by performing a positive or negative stuff operation on the data based on a total time delay of the first and second buffers.

24. The method of claim 23 further including the step of providing the data to a communications network within the second clock domain by the stuffing circuit.

25. The method of claim 23 wherein the mapping step includes, in the event the total time delay of the first and second buffers exceeds a predetermined high threshold value, performing the negative stuff operation on the data.

26. The method of claim 23 wherein the mapping step includes, in the event the total time delay of the first and second buffers is below a predetermined low threshold value, performing the positive stuff operation on the data.

27. In a communications system comprising a plurality of clock domains, a method for asynchronously de-mapping digital data from a first clock domain to a second clock domain, comprising the steps of:

de-mapping digital data from the first clock domain to the second clock domain by a de-stuffing circuit by removing at least one stuff bit from the data;

storing the data from the de-stuffing circuit at a first clock rate by a buffer;

providing the data to the second clock domain at a second clock rate by the buffer; and generating a second clock having the second clock rate from a first clock having the first clock rate by a frequency control path including a first frequency divider and a phase-locked loop coupled to the first frequency divider, the phase-locked loop including a phase detector, a low pass filter, and a voltage-controlled oscillator in a feed forward path, and a second frequency divider in a feedback path, the second frequency divider being variable based at least in part on whether the data had undergone a negative or positive stuff operation before being de-mapped by the de-stuffing circuit.

28. The method of claim 27 further including the step of providing the data to a communications network within the second clock domain.

29. The method of claim 27 wherein the generating step further includes, in the event the data had undergone a negative stuff operation before de-mapping, dividing the first clock rate by a first predetermined value by the second frequency divider.

30. The method of claim 29 wherein the generating step further includes, in the event the data had undergone a positive stuff operation before de-mapping, dividing the first clock rate by a second predetermined value by the second frequency divider.

* * * * *

UNITED STATES PATENT AND TRADEMARK OFFICE
CERTIFICATE OF CORRECTION

| | | |
|---|---|---|
| PATENT NO. | : 7,180,914 B2 | Page 1 of 1 |
| APPLICATION NO. | : 10/223572 | |
| DATED | : February 20, 2007 | |
| INVENTOR(S) | : Timothy P. Walker et al. | |

It is certified that error appears in the above-identified patent and that said Letters Patent is hereby corrected as shown below:

Column 6, line 27, "218" should read --216--.

Signed and Sealed this

Thirty-first Day of July, 2007

JON W. DUDAS
*Director of the United States Patent and Trademark Office*